US012661730B2

(12) United States Patent  
Choi et al.

(10) Patent No.: US 12,661,730 B2  
(45) Date of Patent: Jun. 23, 2026

(54) METHOD OF MANUFACTURING WELDED STRUCTURE, WELDED STRUCTURE, AND BATTERY CASE

(71) Applicant: HYUNDAI MOBIS CO., LTD., Seoul (KR)

(72) Inventors: Wook Han Choi, Yongin-si (KR); Lee Seung Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 897 days.

(21) Appl. No.: 17/855,084

(22) Filed: Jun. 30, 2022

(65) Prior Publication Data

US 2023/0286073 A1 Sep. 14, 2023

(30) Foreign Application Priority Data

Mar. 8, 2022 (KR) ........................ 10-2022-0029281

(51) Int. Cl.
| | |
|---|---|
| *B23K 9/00* | (2006.01) |
| *B23K 9/025* | (2006.01) |
| *B23K 9/16* | (2006.01) |
| *B23K 20/12* | (2006.01) |
| *B23K 35/38* | (2006.01) |
| *B23K 101/36* | (2006.01) |
| *B23K 103/10* | (2006.01) |

(52) U.S. Cl.
CPC ............ *B23K 9/0026* (2013.01); *B23K 9/025* (2013.01); *B23K 9/16* (2013.01); *B23K 20/122* (2013.01); *B23K 35/38* (2013.01); *B23K 2101/36* (2018.08); *B23K 2103/10* (2018.08)

(58) Field of Classification Search
CPC ........ B23K 9/0026; B23K 9/025; B23K 9/16; B23K 20/122; B23K 35/38; B23K 2103/10; B23K 2101/36
See application file for complete search history.

(56) References Cited

FOREIGN PATENT DOCUMENTS

| | | |
|---|---|---|
| CN | 109175614 A | 1/2019 |
| CN | 111347862 A | 6/2020 |
| CN | 112008271 A | 12/2020 |
| CN | 113199131 A | 8/2021 |
| CN | 215034444 U | 12/2021 |

(Continued)

OTHER PUBLICATIONS

Machine translation of Sato JP 2010284703 performed on May 14, 2025 (Year: 2010).*

(Continued)

*Primary Examiner* — Brian W Jennison

(74) *Attorney, Agent, or Firm* — NSIP Law

(57) ABSTRACT

A method of manufacturing a welded structure includes a preparation operation of arranging a first member to overlap a second member; a first welding operation of forming a first welding line on a first surface of the first member by welding a portion at which the first member overlaps the second member, the first surface of the first member being a surface of the first member facing the second member; a second welding operation of forming a second welding line on a second surface of the first member by welding the portion at which the first member overlaps the second member, the second surface of the first member being a surface opposite to the first surface; and connecting the first welding line to the second welding line.

9 Claims, 11 Drawing Sheets

(56)         References Cited

FOREIGN PATENT DOCUMENTS

| | | |
|---|---|---|
| DE | 10 2020 209 654 A1 | 12/2021 |
| JP | 2004-160481 A | 6/2004 |
| JP | 2009-136884 A | 6/2009 |
| JP | 2010-284703 A | 12/2010 |
| JP | 2010-284706 A | 12/2010 |
| JP | 2020-100251 A | 7/2020 |
| KR | 10-1269807 B1 | 6/2013 |
| KR | 10-2019-0095751 A | 8/2019 |
| KR | 10-2019-0138072 A | 12/2019 |

OTHER PUBLICATIONS

Machine translation of Lu CN 112008271 performed on May 14, 2025 (Year: 2020).*
Machine translation of Sato JP 2009136884 performed on May 14, 2025 (Year: 2009).*
Machine translation of Garnweidner et al (DE 102020209654), performed on Nov. 4, 2025 (Year: 2021).*
Extended European Search Report Issued on Dec. 23, 2023, in counterpart European Patent Application No. 22181942.8 (7 Pages in English).
Korean Office Action issued on Sep. 4, 2023 in corresponding Korean Patent Application No. 10-2022-0029281 (6 pages in Korean).
Chinese Office Action issued on Apr. 29, 2025 in corresponding Chinese Patent Application No. 202210865901.1. (11 pages in Chinese).

* cited by examiner

METHOD OF MANUFACTURING WELDED STRUCTURE, WELDED STRUCTURE, AND BATTERY CASE

CROSS-REFERENCE TO RELATED APPLICATION

This application claims the benefit of priority to Korean Patent Application No. 10-2022-0029281, filed in the Korean Intellectual Property Office on Mar. 8, 2022, the entire contents of which are incorporated herein by reference.

TECHNICAL FIELD

The present disclosure relates to a method of manufacturing a welded structure, a welded structure, and a battery case.

BACKGROUND

In recent years, as environmental pollution increases, the development of electric vehicles (EVs) and fuel cell vehicles that are environmental-friendly vehicles has been actively carried out. The environmental-friendly vehicles include a battery pack having a high-voltage battery.

The battery pack includes a battery module and a battery case in which the battery module is accommodated. Since the battery pack has a possibility of a fire due to foreign substances introduced from the outside, the airtightness performance and watertightness performance of the battery case are required. The battery case includes a metal support panel and a metal frame that forms an edge on an upper surface of the support panel so as to form an accommodation space. The support panel and the frame are joined to each other by lap welding.

When a battery case according to the related art is manufactured, the support panel and the frame are welded on the same surface of the support panel, a closed-loop shape welding line is formed on the same surface of the support panel, and thus the airtightness performance and watertightness performance are secured.

However, according to a manufacturing method according to the related art, since the support panel and the frame are welded on the same surface, it is difficult to implement battery cases having various structures. In detail, to form a closed-loop shape of the welding line of the battery case, there is a limitation in arrangement of internal components, and there is a problem in that electrical components connected to the outside and cooling water inlet and outlet ports protrude from an outer line of the battery case. In this case, a separate protective member and a separate fastening structure are required to protect the electrically connected components and the cooling water inlet and output ports. Further, when it is difficult to form the closed-loop shape due to structural constraints, a sealer is applied to supplement the closed-loop shape, but according to this method, there is a limitation in securing the airtightness and the watertightness, and there is a disadvantage in that a separate process is added.

Thus, when the battery case is manufactured by lap welding of a plurality of members, and when it is difficult to form the closed loop of the welding line on the same surface, there is a need to improve a structure that may secure the airtightness performance and the watertightness performance while increasing the degree of structural freedom.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made to solve the above-mentioned problems occurring in the prior art while advantages achieved by the prior art are maintained intact.

An aspect of the present disclosure provides a method of manufacturing a welded structure, a welded structure, and a battery case, which secures the airtightness and watertightness even when a welding line having a closed-loop shape is not formed on the same surface.

Another aspect of the present disclosure provides a method of manufacturing a welded structure, a welded structure, and a battery case, in which the degree of structural freedom may be increased while the airtightness performance and watertightness performance are satisfied.

In one general aspect, a method of manufacturing a welded structure includes a preparation operation of arranging a first member to overlap a second member; a first welding operation of forming a first welding line on a first surface of the first member by welding a portion at which the first member overlaps the second member, the first surface of the first member being a surface of the first member facing the second member; a second welding operation of forming a second welding line on a second surface of the first member by welding the portion at which the first member overlaps the second member, the second surface of the first member being a surface opposite to the first surface; and connecting the first welding line to the second welding line.

The first welding line may be connected to the second welding line to form a closed-loop shape along a circumferential region of the first member.

The first welding line may include a plurality of first welding lines spaced apart from each other, the second welding line may include plurality of second welding lines, and each of the second welding lines may be connected to an adjacent first welding line.

The first welding operation and the second welding operation may be performed by different welding methods.

In the first welding operation, the first welding line may be formed on the first surface using a first welding machine, and in the second welding operation, the second welding line may be formed on the second surface using a second welding machine that is a component separate from the first welding machine.

The second welding operation may include forming a welding hole through the first member, and the method may include filling the welding hole through welding by the first welding machine after the first welding operation and the second welding operation have been performed.

The first welding operation may be performed by arc welding, and the second welding operation may be performed by friction stir welding (FSW).

The first welding operation may be performed by any one of metal inert gas (MIG) welding and tungsten inert gas (TIG) welding.

The first member and the second member may be made of aluminum or aluminum alloy.

In another general aspect, a welded structure includes a first member including a first surface and a second surface opposite to the first surface, and a second member joined to the first surface of the first member, wherein the first member and the second member are joined to each other by a first welding line formed on the first surface of the first member and a second welding line formed on the second surface of the first member, and the first welding line and the second welding line are connected to each other.

The first welding line and the second welding line may form a closed loop along a circumferential region of the first member.

In another general aspect, a battery case includes a support panel including a first surface and a second surface opposite to the first surface, and a frame joined to the first surface of the support panel and disposed along a circumferential region of the support panel, and wherein the support panel is joined to the frame by a first welding line formed on the first surface and a second welding line formed on the second surface, and the first welding line and the second welding line are connected to each other.

The first welding line and the second welding line may form a closed loop along a circumferential region of the support panel.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, embodiments described below are embodiments suitable for understanding the technical features of a method of manufacturing a welded structure, a welded structure, and a battery case corresponding to the present disclosure. However, the present disclosure is not limited to the embodiments described below, the technical features of the present disclosure are not limited by the described embodiments, and various modifications may be made within the technical scope of the present disclosure.

Figure 1:
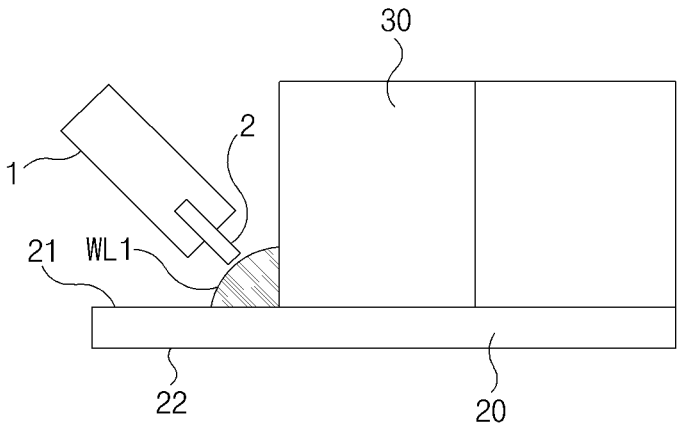
FIG. 1 is a view for describing a method of manufacturing a welded structure according to a first embodiment of the present disclosure and is a view illustrating a first welding operation.
Figure 2:
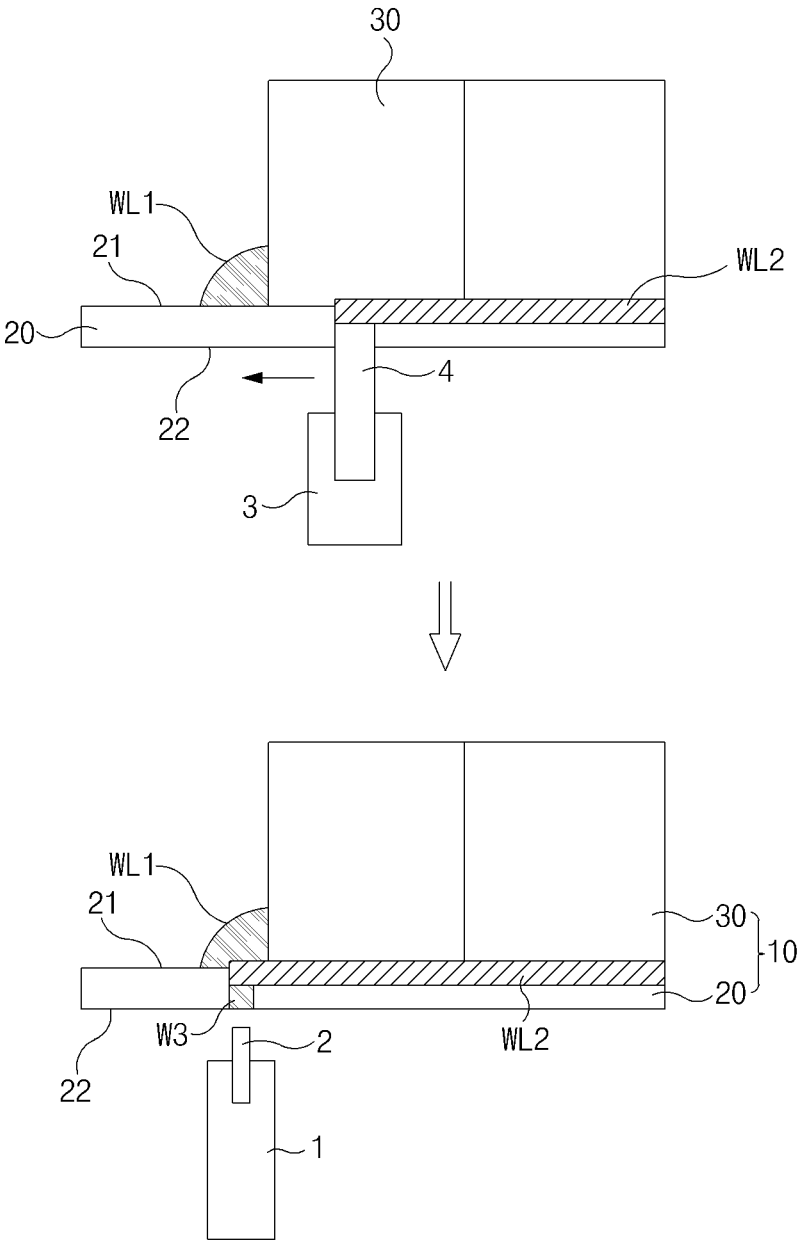
FIG. 2 is a view for describing the method of manufacturing a welded structure according to the first embodiment of the present disclosure and is a view illustrating a second welding operation.
Figure 3:
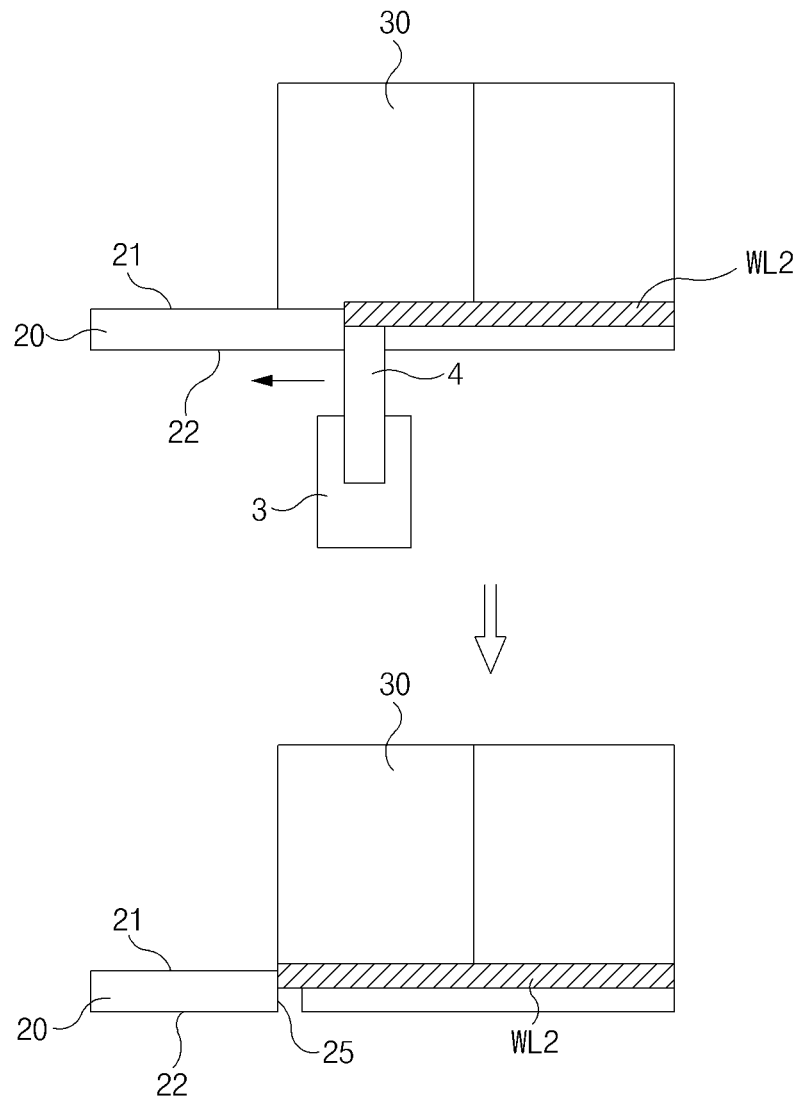
FIG. 3 is a view for describing a method of manufacturing a welded structure according to a second embodiment of the present disclosure and is a view illustrating a second welding operation.
Figure 4:
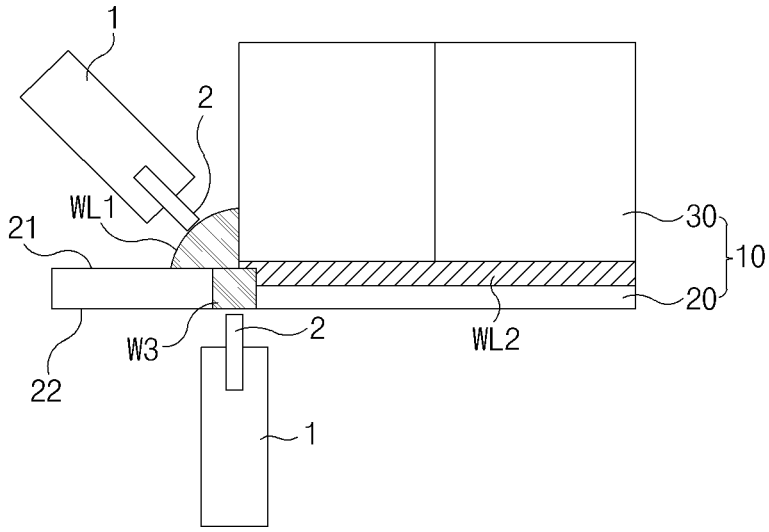
FIG. 4 is a view for describing the method of manufacturing a welded structure according to the second embodiment of the present disclosure and is a view illustrating a first welding operation.
Figure 5:
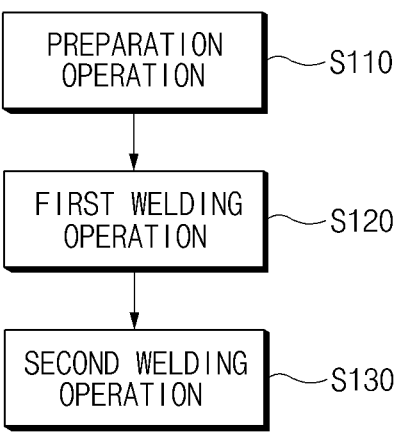
FIG. 5 is a flowchart of the method of manufacturing a welded structure according to the first embodiment of the present disclosure.
Figure 6:
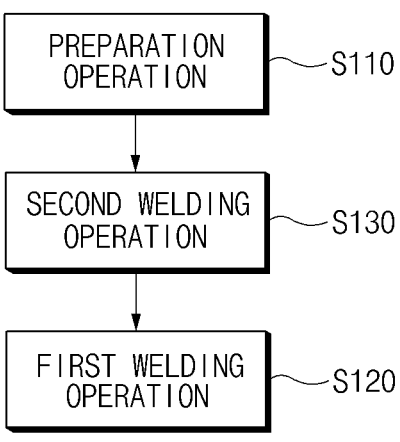
FIG. 6 is a flowchart of the method of manufacturing a welded structure according to the second embodiment of the present disclosure.

FIG. 1 is a view for describing a method of manufacturing a welded structure according to a first embodiment of the present disclosure and is a view illustrating a first welding operation, FIG. 2 is a view for describing the method of manufacturing a welded structure according to the first embodiment of the present disclosure and is a view illustrating a second welding operation, FIG. 3 is a view for describing a method of manufacturing a welded structure according to a second embodiment of the present disclosure and is a view illustrating a second welding operation, FIG. 4 is a view for describing the method of manufacturing a welded structure according to the second embodiment of the present disclosure and is a view illustrating a first welding operation, FIG. 5 is a flowchart of the method of manufacturing a welded structure according to the first embodiment of the present disclosure, and FIG. 6 is a flowchart of the method of manufacturing a welded structure according to the second embodiment of the present disclosure.

Figure 7:
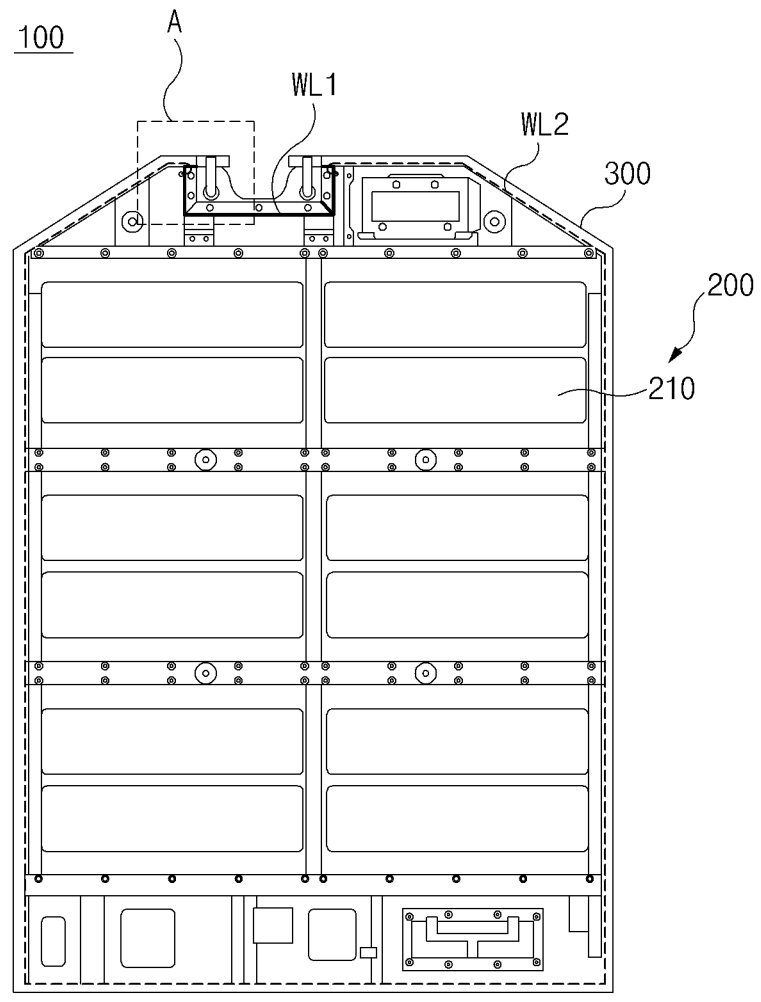
FIG. 7 is a view when viewed from a first surface of the battery case according to an embodiment of the present disclosure and is a view for describing a closed-loop shape of a welding line.
Figure 8:
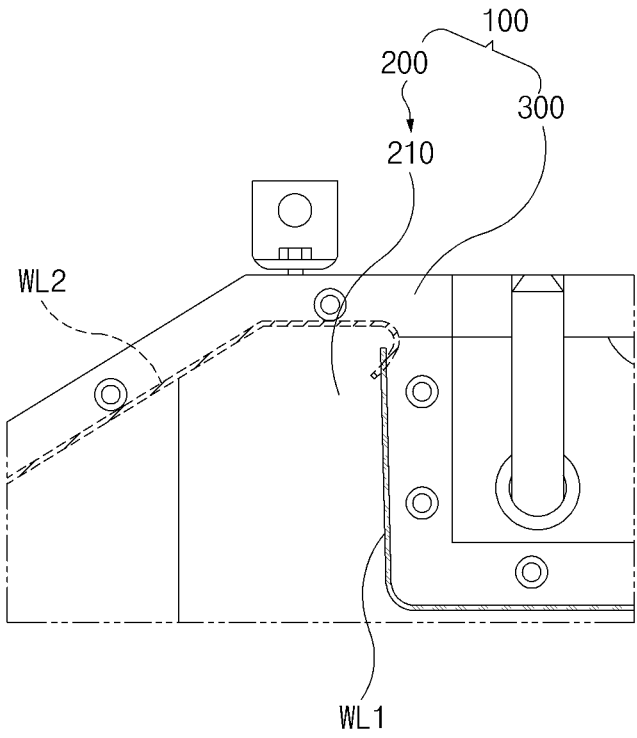
FIG. 8 is a view illustrating a part of the first surface of the battery case according to an embodiment of the present disclosure and is a view illustrating part "A" of FIG. 7.
Figure 9:
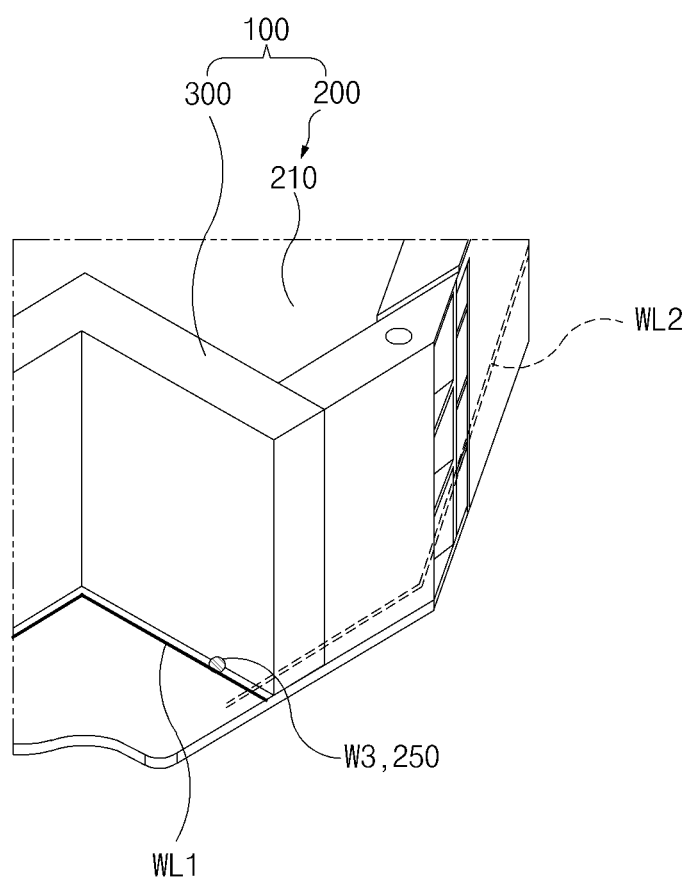
FIG. 9 is an enlarged perspective view of a part of the battery case according to an embodiment of the present disclosure and is a view illustrating an example of the welding line.
Figure 10:
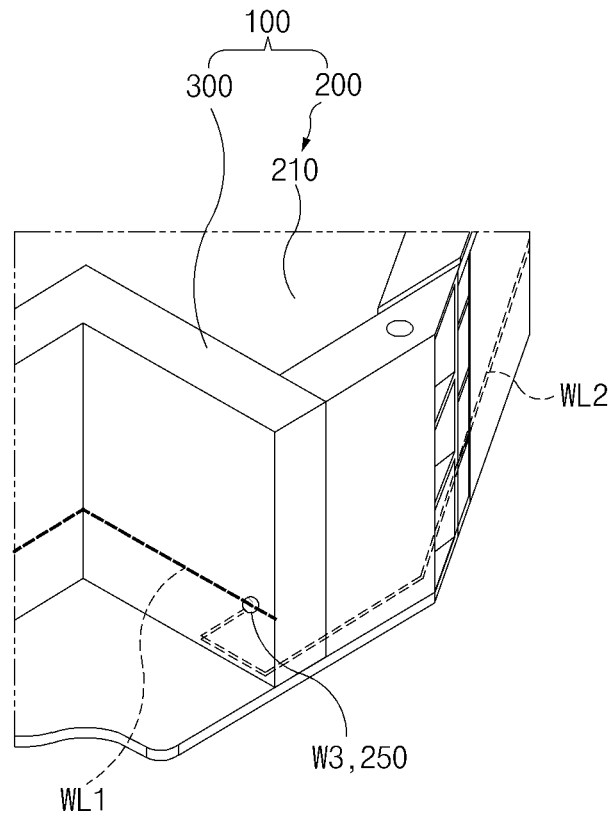
FIG. 10 is an enlarged perspective view of a part of the battery case according to an embodiment of the present disclosure and is a view illustrating another example of the welding line.
Figure 11:
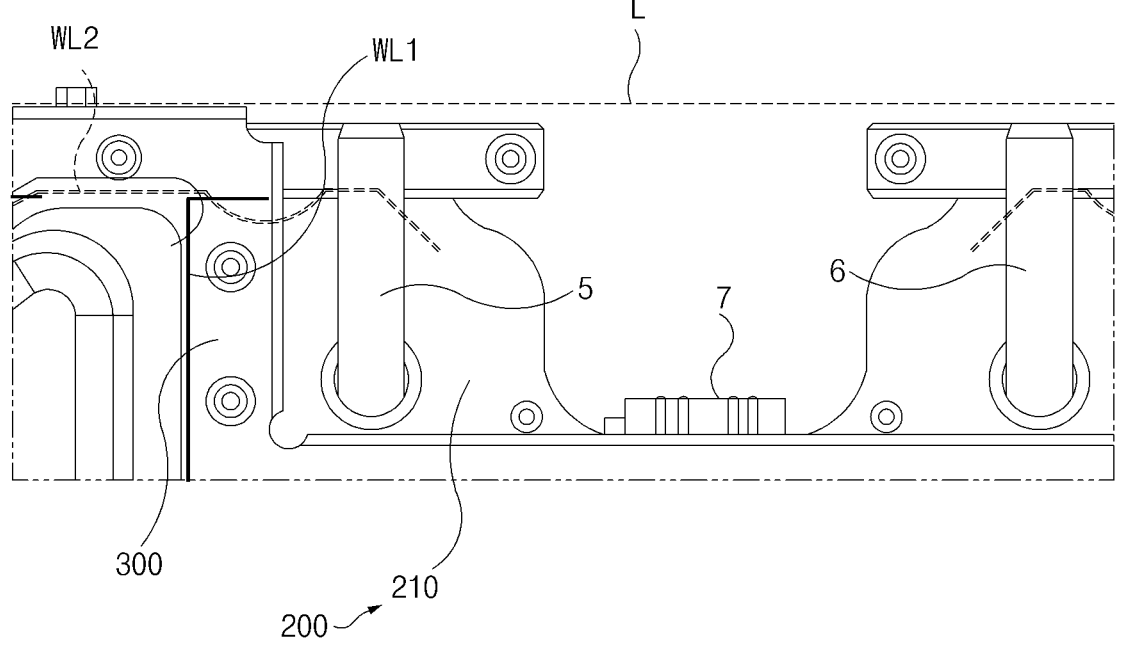
FIG. 11 is an enlarged view illustrating a part of the first surface of the battery case according to the present disclosure.

FIG. 7 is a view when viewed from a first surface of the battery case according to an embodiment of the present disclosure and is a view for describing a closed-loop shape of a welding line, FIG. 8 is a view illustrating a part of the first surface of the battery case according to an embodiment of the present disclosure and is a view illustrating part "A" of FIG. 7, FIG. 9 is an enlarged perspective view of a part of the battery case according to an embodiment of the present disclosure and is a view illustrating an example of the welding line, FIG. 10 is an enlarged perspective view of a part of the battery case according to an embodiment of the present disclosure and is a view illustrating another example of the welding line, and FIG. 11 is an enlarged view illustrating a part of the first surface of the battery case according to the present disclosure.

Referring to FIGS. 5 and 6, the method of manufacturing a welded structure according to the embodiment of the present disclosure includes a preparation operation S110, a first welding operation S120, and a second welding operation S130.

The preparation operation S110 is an operation of arranging a first member 20 and a second member 30 to overlap each other.

In detail, a welded structure 10 according to the present disclosure is a structure in which two members are joined to each other by welding, one of the two members joined to each other is defined as the first member 20, and the other one thereof is defined as the second member 30. Further, a surface of the first member 20 facing the second member 30 is defined as a first surface 21 and a surface of the first member 20 opposite to the first surface 21 is defined as a second surface 22.

For example, as illustrated, the first member 20 may be formed in a plate shape, and the second member 30 may be formed in various shapes. The second member 30 may be disposed to overlap at least a partial region of the first member 20. As an example, the first member 20 may be a support panel of the battery case, and the second member 30 may be a frame forming an edge on the first surface 21 of the first member 20.

However, the shapes and examples of the first member 20 and the second member 30 are not limited to the above description. Further, the first member 20 means one of the two members joined to each other.

As described above, when the surface of the first member 20 facing the second member 30 is referred to as the first surface 21, and the surface opposite to the first surface 21 is referred to as the second surface 22, the first welding operation S120 is an operation of forming a first welding line WL1 on the first surface 21 by welding a portion at which the first member 20 and the second member 30 overlap each other.

The second welding operation S130 is an operation of forming a second welding line WL2 on the second surface 22 by welding the portion at which the first member 20 and the second member 30 overlap each other.

Further, in the operation, which is performed later in time series, among the first welding operation S120 and the second welding operation S130, the first welding line WL1 and the second welding line WL2 are connected to each other.

In detail, in the first welding operation S120, the first surface 21 of the first member 20 is welded, and the first welding line WL1 is formed on the first surface 21 by welding. In the second welding operation S130, the second surface 22 of the first member 20 is welded, and the second welding line WL2 is formed on the second surface 22 by welding. In this way, according to the present disclosure, a welding line may be formed on each of the first surface 21 and the second surface 22 that are different surfaces of the first member 20.

Here, one of the first welding operation S120 and the second welding operation S130 may be firstly performed, and the other one thereof may be performed later. For example, referring to the first embodiment illustrated in FIGS. 1, 2, and 5, after the first welding operation S120 is performed, the second welding operation S130 may be performed. Further, for example, referring to the second embodiment illustrated in FIGS. 3, 4, and 6, after the second welding operation S130 is performed, the first welding operation S120 may be performed. Further, for example, the first welding operation S120 and the second welding operation S130 may be alternately performed.

In this case, in the operation, which is performed later in time series, among the first welding operation S120 and the second welding operation S130, the first welding line WL1 and the second welding line WL2 may be connected to each other. That is, in the welding process, the first welding line WL1 and the second welding line WL2 formed on different surfaces of the first member 20 may be connected to each other.

Further, the first welding line WL1 and the second welding line WL2 are connected to each other to form a closed-loop shape along a circumferential region of the first member 20. That is, a start point and an end point of the first welding line WL1 are connected to the second welding line WL2, a start point and an end point of the second welding line WL2 are connected to the first welding line WL1, and thus the first welding line WL1 and the second welding line WL2 may be formed in the closed-loop shape as a whole.

In this case, each of the first welding line WL1 and the second welding line WL2 may be formed as one or a plurality of them. In detail, the plurality of first welding lines WL1 may be formed to be spaced apart from each other. Further, the plurality of second welding lines WL2 are provided, and each of the second welding lines WL2 may be formed to connect the first welding lines WL1 adjacent to each other.

That is, when at least of the first welding line WL1 and the second welding line WL2 is provided as a plurality thereof, a plurality of connection points of the first welding line WL1 and the second welding line WL2 may be formed.

In this way, using the method of manufacturing a welded structure according to the embodiment of the present disclosure, when two or more members are joined by welding, even when there are structural constraints, the welding line having a closed-loop shape may be smoothly formed. Accordingly, according to the present disclosure, as well as the degree of structural freedom increases, the first member 20 and the second member 30 may be firmly joined to each other.

The first member 20 and the second member 30 may be made of aluminum or aluminum alloy. However, the materials of the first member 20 and the second member 30 are not limited thereto, and the first member 20 and the second member 30 may be made of various metal materials and may be made of different materials or the same materials.

Meanwhile, the first welding operation S120 and the second welding operation S130 may be performed by different welding methods. This is for welding different surfaces of the first member 20 and thereby connecting the welding lines to each other.

In detail, in the first welding operation S120, the first welding line WL1 may be formed on the first surface 21 using a first welding machine 1. Further, in the second welding operation S130, the second welding line WL2 may be formed on the second surface 22 using a second welding machine 3 that is a component separate from the first welding machine 1. Here, the first welding machine 1 and the second welding machine 3 are provided to perform welding in different methods.

For example, the first welding operation S120 may be performed by arc welding. As an example, the first welding operation S120 may be performed by one of metal inert gas (MIG) welding and tungsten inert gas (TIG) welding.

The arc welding is a method of performing welding by melting a joint by electric arc heat and includes the MIG welding method and the TIG welding method using an inert gas. The MIG welding method is a welding method in which a metal wire substantially the same as that of a base material is used as an electrode in insert gas arc welding. The TIG welding method is a welding method in which a tungsten rod is used as an electrode in inert gas arc welding.

In the first welding operation S120, one of the MIG welding and the TIG welding may be performed. However, the first welding operation S120 is not limited thereto, and other arc welding methods may be used. Hereinafter, an example in which the MIG welding is performed in the first welding operation S120 will be described.

For example, the first welding machine 1 may be a MIG welding machine and may include a MIG welding torch 2. In the first welding operation S120, the MIG welding machine is installed on the first surface 21, and by driving the MIC welding machine, the MIG welding torch 2 generates an arc between the first member 20 and the second member 30. Accordingly, the first welding line WL1 is formed on the first surface 21.

Meanwhile, the second welding operation S130 may be performed by friction stir welding (FSW). The FSW refers to a method in which a rotating tool is installed at a metal joint part and divided metal is joined by frictional heat generated between the rotating tool and joint metal. The FSW is mainly used for plates made of non-ferrous materials such as aluminum alloys that are prone to cracking and welding deformation during high-temperature fusion welding.

For example, the second welding machine 3 may be a friction stir welding tool 3 and may include a probe 4 that is the rotating tool and a driving motor that rotates the probe 4. In the second welding operation S130, the friction stir welding tool 3 is installed on the second surface 22, and while the probe 4 rotates when the driving motor is operated, frictional heat is generated between the probe 4 and a joint part that is a part in which the first member 20 and the second member 30 overlap each other. Solid-phase joint is achieved while a material stirring action is activated at the joint part due to the frictional heat and the pressure applied by the probe 4. Accordingly, the second welding line WL2 is formed on the second surface 22.

Meanwhile, referring to FIGS. 1 and 2, in the second welding operation S130, a welding hole 25 passing through the first member 20 may be formed. The welding hole 25 is formed by the probe 4 of the second welding machine 3 and may be formed in the first member 20 at a portion at which the first welding line WL1 and the second welding line WL2 meet each other. The welding hole 25 needs to be filled in a welding process.

The embodiment of the present disclosure may further include an operation of filling the welding hole 25 through welding by the first welding machine 1 after the operation performed later among the first welding operation S120 and the second welding operation S130. That is, an arc is generated around the welding hole 25 by the first welding machine 1, and thus the welding hole 25 may be filled. An undescribed reference numeral W3 denotes a welding portion formed in the welding hole 25.

Meanwhile, hereinafter, the method of manufacturing a welded structure according to the embodiment of the present disclosure will be described in detail with reference to FIGS. 1 to 6. However, the present disclosure is not limited to the illustrated embodiments and the following description and may be variously modified within the technical range of the present disclosure.

Referring to FIGS. 1, 2, and 5, in the method of manufacturing a welded structure according to the first embodiment of the present disclosure, firstly, the second member 30 is disposed to overlap the first surface 21 of the first member 20. As an example, the second member 30 may be disposed to overlap the first member 20 along the circumferential region thereof.

Thereafter, the first welding operation S120 is performed. In the first welding operation S120, the MIG welding machine that is the first welding machine 1 is installed on the first surface 21, and by driving the first welding machine 1, an arc is generated between the first member 20 and the second member 30. Accordingly, the first welding line WL1 is formed on the first surface 21.

Thereafter, the second welding operation S130 is performed. In the second welding operation S130, the friction stir welding tool 3 is installed on the second surface 22 that is a surface opposite to the first surface 21, and by rotating the probe 4, the frictional heat is generated between the probe 4 and the joint part that is the part in which the first member 20 and the second member 30 overlap each other. Accordingly, the second welding line WL2 is formed on the second surface 22 by the solid-phase joint.

In this case, in the second welding operation S130, when the second welding line WL2 is formed, the start point and the end point of the second welding line WL2 is connected to the first welding line WL1. Accordingly, the first welding line WL1 formed on the first surface 21 and the second welding line WL2 formed on the second surface 22 are connected to each other. Thereafter, the first welding machine 1 is installed on the second surface 22, an arc is generated in and around the welding hole 25, and thus the welding hole 25 may be filled.

Accordingly, the welding line having a closed-loop shape may be formed along the circumferential region of the first member 20.

Meanwhile, referring to FIGS. 3, 4, and 6, in the method of manufacturing a welded structure according to the second embodiment of the present disclosure, firstly, the second member 30 is disposed to overlap the first surface 21 of the first member 20. As an example, the second member 30 may be disposed to overlap the first member 20 along the circumferential region thereof.

Thereafter, the second welding operation S130 is performed. In the second welding operation S130, the friction stir welding tool 3 is installed on the second surface 22, and by rotating the probe 4, the frictional heat is generated between the probe 4 and the part in which the first member 20 and the second member 30 overlap each other. Accordingly, the second welding line WL2 is formed on the second surface 22 by the solid-phase joint.

Thereafter, the first welding operation S120 is performed. In the first welding operation S120, the first welding machine 1 is installed on the first surface 21 that is a surface opposite to the second surface 22, and by driving the first welding machine 1, an arc is generated between the first member 20 and the second member 30. Accordingly, the first welding line WL1 is formed on the second surface 22.

In this case, in the first welding operation S120, when the first welding line WL1 is formed, the start point and the end point of the first welding line WL1 is connected to the second welding line WL2. Accordingly, the second welding line WL2 formed on the second surface 22 and the first welding line WL1 formed on the first surface 21 are connected to each other. Thereafter, the first welding machine 1 is installed on the second surface 22, an arc is generated in and around the welding hole 25, and thus the welding hole 25 may be filled.

Accordingly, the welding line having a closed-loop shape may be formed along the circumferential region of the first member 20.

Meanwhile, hereinafter, the welded structure 10 according to the present disclosure will be described with reference to FIGS. 2 and 4. The welded structure 10 according to the present disclosure is manufactured by the above method of manufacturing a welded structure. Thus, all the above configurations may be included. Hereinafter, a duplicated description of the same configuration will be omitted.

The welded structure 10 according to the present disclosure includes the first member 20 and the second member 30.

The first member 20 includes the first surface 21 and the second surface 22 that is a surface opposite to the first surface 21. Further, the second member 30 is joined to the first surface 21 of the first member 20.

Here, the first member 20 and the second member 30 are joined to each other by the first welding line WL1 formed on the first surface 21 and the second welding line WL2 formed on the second surface 22, and the first welding line WL1 and the second welding line WL2 are connected to each other.

For example, the first welding line WL1 and the second welding line WL2 may form a closed loop along the circumferential region of the first member 20. That is, the start point and the end point of the first welding line WL1 are connected to the second welding line WL2, and thus the first welding line WL1 and the second welding line WL2 may be formed in a closed-loop shape as a whole.

In this way, in the welded structure 10 according to the embodiment of the present disclosure, the welding lines formed on the different surfaces of the first member 20 are connected to each other to form the entire welding line having a closed-loop shape, and thus even when there are structural constraints, the welding line having a closed-loop shape may be smoothly formed.

Hereinafter, a battery case 100 according to the present disclosure will be described. The battery case 100 according to the present disclosure is an example of the welded structure 10 and may be manufactured by using the above-described method of manufacturing a welded structure. A support panel 200 described below may be the first member 20, and a frame 300 may be the second member 30. The battery case 100 according to the present disclosure may include all configurations included in the welded structure 10 and the method of manufacturing the same. Hereinafter, a detailed description of the duplicated configuration will be omitted.

For example, the battery case 100 according to the present disclosure is provided in a vehicle battery pack, and a battery module having a high-voltage battery may be accommodated in the battery case 100. In this case, the airtightness performance and watertightness performance of the battery case 100 are required. However, the battery case 100 according to the present disclosure is not limited to a battery case for a vehicle.

The battery case 100 according to the present disclosure includes the support panel 200 and the frame 300.

The support panel 200 includes a first surface 210 and a second surface 220 that is a surface opposite to the first surface 210. Further, the frame 300 is joined to the first surface 210 of the support panel 200 and is provided along a circumferential region of the support panel 200. The support panel 200 and the frame 300 may be joined to each other to form an accommodation space in which the battery module is accommodated.

Here, the support panel 200 and the frame 300 are joined to each other by the first welding line WL1 formed on the first surface 210 and the second welding line WL2 formed on the second surface 220, and the first welding line WL1 and the second welding line WL2 are connected to each other.

For example, the first welding line WL1 and the second welding line WL2 may form a closed loop along the circumferential region of the support panel 200. The airtightness performance and watertightness performance of the battery case 100 may be improved by the first welding line WL1 and the second welding line WL2 having a closed-loop shape.

In the welded structure 10 according to the embodiment of the present disclosure, the welding lines formed on the different surfaces of the support panel 200 are connected to each other to form the entire welding line having a closed-loop shape, and thus even when there are structural constraints, the welding line having a closed-loop shape may be smoothly formed.

In detail, it may be difficult to perform welding for joining the support panel 200 and the frame 300 due to structural constraints such as arrangement of components accommodated inside the battery case 100 and locations of electrically connected components 7 and inlet and outlet ports 5 and 6. In particular, when the battery case 100 is manufactured, the electrically connected components 7 and the inlet and outlet ports 5 and 6 are designed so as not to protrude from an extension line of an outermost line of the battery case 100, and thus, it may be difficult to weld this part in a closed-loop shape.

Referring to FIGS. 7 to 11, the support panel 200 and the frame 300 according to the embodiment of the present disclosure may be joined to each other by the first welding line WL1 formed on the first surface 210 and the second welding line WL2 formed on the second surface 220. Thus, when the welding is performed, the welding may be selectively performed on the first surface 210 and the second surface 220 according to a structure of each region around the battery case 100.

FIG. 9 is a view illustrating an example of the first and second welding lines, and FIG. 10 is a view illustrating another example of the first and second welding lines. The first welding line WL1 and the second welding line WL2 are not limited to the illustrated embodiments and may be variously changed according to the structure of the battery case 100. Further, an undescribed reference numeral 250 of FIGS. 9 and 10 denotes a welding hole formed in the support panel 200, and W3 denotes a welded portion formed in the welding hole 250.

Accordingly, for example, the first welding line WL1 and the second welding line WL2 may be connected to each other to form the welding line having a closed-loop shape even in a region in which the structure is complicated due to the electrically connected components 7 and the inlet and outlet ports 5 and 6. Accordingly, a structure may be implemented in which the electrically connected components 7 and the inlet and outlet ports 5 and 6 are located inside the outermost line of the battery case 100, that is, an extension line (see line L in FIG. 11) of an outer line of the support panel 200.

Thus, according to the present disclosure, the degree of structural freedom may be increased while the airtightness performance and watertightness performance of the battery case 100 are satisfied. Further, according to the present disclosure, a structure may be implemented in which the electrically connected components 7 and the cooling water inlet and outlet ports 5 and 6 provided in the battery pack do not protrude, and collision stability of the battery case 100 may be improved.

When the method of manufacturing a welded structure, the welded structure, and the battery case according to the embodiment of the present disclosure are used as described above, when two or more members are joined by welding, the airtightness and watertightness may be secured even when the welding line having a closed-loop shape is not formed on the same surface.

According to the embodiment of the present disclosure, the degree of structural freedom may be increased while the airtightness performance and watertightness performance of the welded structure and the battery case are satisfied.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A method of manufacturing a welded structure, the method comprising:

a preparation operation of arranging a first member to overlap a second member;

a first welding operation of forming a first welding line on a first surface of the first member by welding a portion at which the first member overlaps the second member, the first surface of the first member being a surface of the first member facing the second member, the first welding operation including forming a welding hole passing through the first member;

a second welding operation of forming a second welding line on a second surface of the first member by welding the portion at which the first member overlaps the second member, the second surface of the first member being a surface opposite to the first surface, the second welding operation including filling the welding hole, wherein the second welding operation connects the first welding line to the second welding line such that a start point and an end point of the first welding line are connected to the second welding line and a start point and an end point of the second welding line are connected to the first welding line, so that the first welding line and the second welding line are connected to each other to form a closed-loop shape along a circumferential region of the first member.

2. The method of claim 1, wherein the first welding line includes a plurality of first welding lines spaced apart from each other, and the second welding line includes plurality of second welding lines, and each of the second welding lines is connected to an adjacent first welding line.

3. The method of claim 1, wherein the first welding operation and the second welding operation are performed by different welding methods.

4. The method of claim 1, wherein, in the first welding operation, the first welding line is formed on the first surface using a first welding machine, and in the second welding operation, the second welding line is formed on the second surface using a second welding machine that is a component separate from the first welding machine.

5. The method of claim 1, wherein the first welding operation is performed by arc welding, and the second welding operation is performed by friction stir welding (FSW).

6. The method of claim 5, wherein the first welding operation is performed by any one of metal inert gas (MIG) welding and tungsten inert gas (TIG) welding.

7. The method of claim 1, wherein the first member and the second member are made of aluminum or aluminum alloy.

8. A welded structure comprising:

a first member including a first surface and a second surface opposite to the first surface; and a second member joined to the first surface of the first member, wherein the first member and the second member are joined to each other by a first welding line formed on the first surface of the first member and a second welding line formed on the second surface of the first member after the first welding line is formed, and wherein the first welding line and the second welding line are connected to each other by completion of the second welding line being formed such that a start point and an end point of the first welding line are connected to the second welding line and a start point and an end point of the second welding line are connected to the first welding line, so that the first welding line and the second welding line are connected to each other to form a closed-loop shape along a circumferential region of the first member.

9. A battery case comprising:

a support panel including a first surface and a second surface opposite to the first surface; and a frame joined to the first surface of the support panel and disposed along a circumferential region of the support panel, wherein the support panel is joined to the frame by a first welding line formed on the first surface and a second welding line formed on the second surface after the first welding line is formed, and wherein the first welding line and the second welding line are connected to each other by completion of the second welding line being formed such that a start point and an end point of the first welding line are connected to the second welding line and a start point and an end point of the second welding line are connected to the first welding line, so that the first welding line and the second welding line are connected to each other to form a closed-loop shape along a circumferential region of the line and the second welding line form a closed loop along the circumferential region of the support.

* * * * *